United States Patent Office 3,079,436
Patented Feb. 26, 1963

3,079,436
BIS-QUATERNARY AMMONIUM COMPOUNDS
Jesse C. H. Hwa, Levittown, Pa., assignor to Rohm & Haas Company, Philadelphia, Pa., a corporation of Delaware
No Drawing. Filed Nov. 25, 1955, Ser. No. 549,194
10 Claims. (Cl. 260—567.6)

The present invention relates to unsymmetrical diquaternary ammonium compounds and to a method for their preparation.

The unsymmetrical diquarternary ammonium compounds of the present invention may be represented by the formula

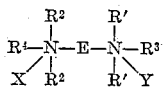

in which $R'$ is preferably an alkyl group of one to two carbon atoms, $R^2$ is preferably an alkyl group of one to two carbon atoms, $R^3$ is a monovalent quaternizing group of one to four carbon atoms, $R^4$ is a monovalent quaternizing group of seven to twenty carbon atoms, X and Y are anions, the group weight of each of which is preferably no greater than about 127, and E is an alkylene, alkenylene, or alkynylene group of two to four carbon atoms.

The preferred representations of X and Y are the halogens chlorine, bromine, and iodine, that is, the halogens having an atomic weight of 35.5 to 127. Also, suitable as representations of X and Y are the anions sulfate, methylsulfate, phosphate, acetate, and the like, preferably having a group weight in the approximate range of the preferred halogen representations. It will be apparent to one skilled in the art that other anions may be employed as X and Y such as hydroxide, tartrate, citrate, and the like. Anions other than the halogens may be supplied directly or by metathesis with the halide form of the quaternary ammonium compound. An anion exchange resin may also be used to provide the desired anion.

The $R'$ and $R^2$ groups are preferably methyl or ethyl groups, that is, alkyl groups of no more than two carbon atoms. The two $R'$ groups or the two $R^2$ groups or both may be taken collectively to represent a divalent saturated aliphatic group of four to five atoms which jointly with the amino nitrogen forms a five- to six-sided monoheterocyclic amine group such as a morpholino, thiamorpholino, pyrrolidinyl or piperidino group, and these groups having a lower alkyl substituent, such as a methyl or ethyl group.

$R^3$ and $R^4$ are monovalent quaternizing groups. $R^3$ must contain from one to four carbon atoms and $R^4$ from seven to twenty carbon atoms. $R^3$ and $R^4$, in the present instance, are preferably composed principally or entirely of carbon and hydrogen and may contain alcohol, ether, thioether, ester, or amide groups. $R^3$ and $R^4$ may exhibit any of the possible spatial configurations.

The important restriction on $R^3$ and $R^4$ is their size, that is, the number of carbon atoms they contain. $R^4$ preferably will have at least approximately twice, and frequently more, as many carbon atoms as $R^3$. $R^3$ and $R^4$ are preferably supplied by compounds having the formulas $R^3Y$ and $R^4X$, respectively, in which X and Y as already defined, are labile enough to undergo quaternization under the present reaction conditions, to be more fully described hereinafter. $R^3$ and $R^4$ are preferably alkyl or alkenyl groups having the number of carbon atoms stated previously. $R^3$ and $R^4$ may quite satisfactorily contain alcohol, ether, ester, and amide groups. In addition $R^4$ may represent an aralkyl or halogen substituted aralkyl group, in which the substituent may be one or more chloro, bromo, nitro, cyano, hydroxy, amido, alkoxy, or carboxy groups.

Typical of the groups that may be employed as $R^3$ include alkyl such as methyl, ethyl, propyl, isopropyl, butyl, isobutyl, tert-butyl; alkenyl such as allyl, butenyl; alkynyl such as propynyl, butynyl; alkoxyalkyl such as methoxymethyl, ethoxyethyl, methoxypropyl; hydroxyalkyl such as hydroxyethyl, hydroxybutyl; carbamoylalkyl such as carbamoylmethyl, carbamoylethyl, carbamoylpropyl; alkoxycarbonylalkyl such as methoxycarbonylmethyl, methoxycarbonylethyl, and ethoxycarbonylmethyl. Typical of the groups that may be employed as $R^4$ include alkyl such as heptyl, octyl, tert-octyl, nonyl, isononyl, decyl, tert-decyl, dodecyl, tetradecyl, hexadecyl, octadecyl, tert-octadecyl, eicosyl; alkenyl such as heptenyl, octenyl, decenyl, dodecenyl, tetradecenyl, octadecenyl, eicosenyl; alkoxyalkyl and alkoxyalkenyl such as methoxyhexyl, methoxynonyl, methoxydecyl, methoxydodecenyl, methoxyoctadecyl, ethoxypentyl, ethoxyoctyl, ethoxydecenyl, ethoxyoctadecyl, propoxybutyl, propoxyoctenyl, propoxydecyl, propoxyheptadecyl, butoxypropyl, butoxybutyl, butoxynonyl, butoxyundecenyl, butoxyhexadecyl, pentoxypentyl, pentoxyoctyl, pentoxypentadecyl, hexoxymethyl cyclohexoxymethyl, hexoxyethyl, hexoxyhexyl, hexoxyoctyl, hexoxytetradecenyl, heptoxyethyl, heptoxyheptyl, heptoxytridecyl, octoxypropyl, octoxyoctyl, octoxydodecenyl, nonoxyethyl, nonoxypentyl, nonoxyundecyl, decoxyethyl, decoxyoctenyl, decoxydecyl, dodecenoxymethyl, dodecoxyoctyl, tetradecoxypropyl, hexadecoxybutyl, octadecoxyethyl; hydroxyalkyl such as hydroxyheptyl, hydroxyoctyl, hydroxydecyl, hydroxydodecyl, hydroxyoctadecyl, hydroxyeicosyl; carbamoylalkyl such as carbamoylhexyl, carbamoyloctyl, carbamoyldecyl, carbamoyldodecyl, carbamoyloctadecyl, carbamoylnonodecyl; alkoxycarbonylalkyl such as methoxycarbonylpentyl, methoxycarbonyloctyl, methoxycarbonyldodecyl, methoxycarbonyloctadecyl, ethoxycarbonyloctyl, ethoxycarbonylundecyl, ethoxycarbonylheptadecyl, propoxycarbonylbutyl, propoxycarbonylheptyl, propoxycarbonylhexadecyl, butoxycarbonylethyl, butoxycarbonyldecyl, butoxycarbonylpentadecyl, pentoxycarbonylpropyl, pentoxycarbonylpentyl, pentoxycarbonyldecyl, hexoxycarbonylmethyl, hexoxycarbonyltridecyl, heptoxycarbonylmethyl, heptoxycarbonylbutyl, heptoxycarbonyldecyl, octoxycarbonylmethyl, octoxycarbonyldecyl, nonoxycarbonylmethyl, nonoxycarbonyldecyl, decoxycarbonylmethyl, decoxycarbonyloctyl, undecoxycarbonylmethyl, dodecoxycarbonylmethyl, dodecoxycarbonylheptyl, tetradecoxycarbonylmethyl, hexadecoxycarbonylpropyl, octadecoxycarbonylmethyl; arylalkyl, alkylarylalkyl, and arylalkenyl such as benzyl, butylbenzyl, octylbenzyl, dodecylbenzyl, dimethylbenzyl, methylbutylbenzyl, butyloctylbenzyl, methyldodecylbenzyl, dihexylbenzyl, phenylethyl, phenylbutyl, naphthylethyl, naphthylbutyl, phenylpentenyl, phenylhexyl, phenyloctyl, phenyldodecyl, phenyltetradecyl; haloarylalkyl such as chlorobenzyl, dichlorobenzyl, bromobenzyl; arylalkyl with nitrogen containing substituents such as cyanobenzyl, nitrobenzyl; hydroxyarylalkyl such as hydroxybenzyl; alkoxyalkylarylalkyl such as methoxymethylbenzyl, methoxybutylbenzyl, butoxybutylbenzyl, octoxyethylbenzyl; aroxyalkyl and alkaroxyalkyl such as phenoxyethyl phenoxyethoxyethyl, octaphenoxyethyl, octaphenoxyethoxyethyl; alkoxycarbonylarylalkyl such as methoxycarbonylbenzyl, butoxycarbonylbenzyl, octoxycarbonylbenzyl; carbamoylarylalkyl such as carbamoylbenzyl, and carbamoylphenyloctyl.

E is a divalent aliphatic group, including an alkylene, alkenylene, or alkynylene group, of two to four carbon atoms. E is preferably an alkylene group of two to four carbon atoms or an alkynylene group of four carbon atoms with the triple bond in the number two position.

While E is, in most cases, entirely hydrocarbon, that is, made up only of carbon and hydrogen, there may be present a single hydroxyl substituent. E may be employed in any of its isomeric forms.

The quaternary ammonium compounds of the present invention are preferably prepared by bringing together at a reacting temperature and thereby causing to react a compound having the formula

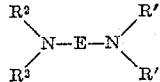

with compounds having the formulas R³Y and R⁴X. The present reaction is preferably a two-step operation involving quaternizing the

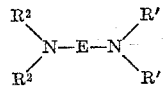

compound with first one of the compounds R³Y and R⁴X and then with the other. It is relatively unimportant which step is first but quaternization first with R³Y is preferred.

In order to assure a high degree of purity of the final product, it is desirable to quaternize in the first step on a mole for mole basis employing in the reaction medium equal molar amounts of each reactant or possibly, an excess of the diamine reactant. Surprisingly, the first step quaternization or monoquaternization occurs substantially quantitatively on a single nitrogen atom. Apparently under the particular reaction conditions employed with the specific reactants concerned the quaternization is favored quantitatively at just one nitrogen atom rather than simultaneously at both nitrogen atoms. Therefore, by employing equimolar amounts of reactants the first step quaternization results in a product that is substantially quantitative at one of the nitrogen atoms. A small amount of diquaternization, however, is not objectionable for the purposes of this invention. Yields of 80–90% and more of the monoquaternized product are consistently obtained. Yields of substantially 100% are not uncommon. At the conclusion of the first step quaternization or monoquaternization the second step quaternization or diquaternization is conducted yielding the products of this invention. By careful control of the amounts of reactants used in the first step it is possible to go directly from the first step quaternization to the second step quaternization without the need of purifying the first step product. If it is felt desirable to purify the first step product, such can be accomplished by distillation of the unused reactants, recrystallization of the monoquaternized product, or solvent extraction of either the product or unused reactants depending on the characteristics of the particular compounds concerned. Of course, if the yield of the monoquaternized product is not substantially quantitative, the excess unused reactants should be removed before the diquaternization is undertaken.

The second step quaternization or diquaternization occurs in an equimolar manner between the first step quaternization product and the second step quaternizing agent, either R³Y or R⁴X, whichever was not used in the first step quaternization. It is preferable in the second step quaternization to employ an excess of the quaternizing agent in order to assure completeness of reaction. Completeness of reaction may be indicated by the amount of ionizable anion formed, such as halide, and the disappearance of basicity. If an excess of quaternizing agent is employed, it may be removed at the completion of the second step quaternization by distillation or solvent extraction, as desired. The diquaternized product may be recrystallized from the solvent employed in the reaction, if desired.

The monoquaternization or first step quaternization is preferably conducted by quaternizing a compound,

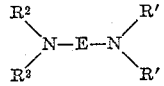

with R³Y in the temperature range of 0° C. to the reflux temperature of the reaction mixture usually not over about 110° C., preferably in the range of 20° to 60° C. It is preferred to use the mildest reaction temperatures possible commensurate with a substantially quantitative yield within a reasonable reaction time. The reaction appears to be most predictable and orderly under the preferred reaction temperatures.

Although not necessary, it is preferred to employ a volatile inert solvent during the first step quaternization such as hexane, benzene, toluene, ethyl ether, butanol, chloroform, 2-butanone, methanol, acetone, water, and the like. The preferred solvents are those of the slow type, that is, ones that are conducive to a relatively slow orderly monoquaternization such as those previously listed. While other solvents may be satisfactorily employed, it is preferred to use solvents that are conducive to a relatively slow rather than a relatively fast reaction. In the first step quaternizations in which solvents that are conducive to a relatively fast reaction are employed, there is sometimes the tendency for formation of diquaternary compounds, that is, compounds in which some quaternization has occurred at both nitrogen atoms. While the presence of some minor amounts of diquaternized compounds formed in the first step quaternization is not unsatisfactory, it is preferred to obtain a substantially quantitative monoquaternized product in the first step quaternization. Apparently the slow or fast quality of the solvent is a reflection of its polarity under the present reaction conditions, the slower solvents being less polar than the faster solvents.

It is usually not necessary to conduct a purification on the monoquaternization product particularly if care is exercized in the amounts of reactants employed as explained hereinbefore. If a purification step is desired, it may preferably be effected by a solvent extraction method depending on the characteristics of the individual reactants and products concerned. For instance, some of the first step quaternization products are soluble in water, ethanol, and the like, while others are insoluble in benzene, heptane, and the like. Similarly, it is so with the reactants and, therefore, separations can be made accordingly.

The diquaternization or second step quaternization is preferably conducted by quaternizing a first step quaternization compound,

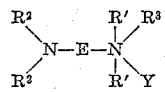

with R⁴X in the temperature range of 60° C. to the reflux temperature of the reaction mixture, preferably at the reflux temperature, temperatures up to about 265° C. being practical. If desired, a catalyst may be employed, such as a polar iodide soluble in the reaction mixture. Sodium iodide is preferred in this respect.

It is preferable to employ a volatile inert solvent in the diquaternization such as those set forth previously for use in the monoquaternization. There may also be used acetonitrile, acrylonitrile, nitromethane, formamide, dimethylformamide, succinonitrile, and the like. If a solvent has been employed in the monoquaternization and no purification step is contemplated, the same solvent may be employed in the diquaternization step as was employed in the monoquaternization step. If no solvent was employed in the monoquaternization step or if a purification of the monoquaternized product was conducted by removing any solvent that had been employed, it is preferable to employ a highly polar solvent in the diquaternization step in order to expedite the reaction. The highly polar solvents are frequently higher boiling than the lowly polar solvents and they thereby permit a higher reflux temperature which tends to expedite the diquaternization step. At the conclusion of the diquaternization step the solvent may be removed by any conventional method such as by distillization, preferably under reduced pressure. The product remains as the residue and is generally crystalline, high wetting, hygroscopic, and usually clear to white in color. Some of the products are heavy oily semi-solids tan to brown in color. The products are substantially water soluble.

It frequently is not necessary to isolate the product from the solvent, since the product is frequently used in aqueous or alcohol solutions or the like.

As an alternative method of preparing some of the compounds of this invention, those in which $R^3$ is a hydroxyalkyl group of two to four carbon atoms, there may be brought together at a reacting temperature, preferably in the range of 20° to 100° C., the reactant

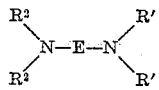

with ethylene, propylene, or butylene oxide in an aqueous or aqueous acidic medium. If it is desired to employ an aqueous acidic medium there may be used any of the acids of this invention that have Y as an anion, such as phosphoric, hydrochloric, sulfuric, hydrobromic, acetic, and the like. If merely an aqueous medium is employed the resultant compound has a hydroxyl group in the Y position, whereas if an aqueous acidic medium is used Y is represented by the anion of the acid used. It is preferred to have the anion of an acid in the Y position. In either case, the diquaternization step with an $R^4X$ compound follows as before.

There has been set forth, heretofore, the representations of X, Y, $R^3$, and $R^4$. In the present invention there are employed as reactants $R^3Y$ and $R^4X$ as described previously. The reactants $R^3Y$ and $R^4X$ can be determined by combining the representations of the component parts previously listed. Typical of the types of $R^3Y$ reactants that may be employed include methyl chloride, butenyl chloride, propynyl chloride, methoxypropyl chloride, hydroxyethyl chloride, chloropropanamide, and methyl chloroacetate. Typical of the types of $R^4X$ reactants that may be used include octyl chloride, dodecenyl chloride, ethoxydodecyl chloride, cyclohexoxymethyl chloride, propoxyoctenyl chloride, hydroxydecyl chloride, chlorooctadecamide, propyl chlorohexadecanoate, octylbenzyl chloride, methyldodecylbenzyl chloride, phenylbutyl chloride, bromobenzyl chloride, cyanobenzyl chloride, nitrobenzyl chloride, hydroxybenzyl chloride, naphthylethyl chloride, methoxymethylbenzyl chloride, butoxybenzyl chloride, and carbamoylbenzyl chloride. The other anion representations of X and Y may be used in place of the chloride form listed above. The halide representation of X and Y is preferred. Where more than one molecular location of X and Y is possible in the reactants $R^3Y$ and $R^4X$ all possibilities are contemplated as long as X and Y are reactive in the present sense, that is, are labile enough to undergo the quaternization contemplated under the present reaction conditions. In unsaturated aliphatic molecules the location of the double or triple bond is not critically significant as long as X and Y remain quaternizationally reactive, as stated before.

Typical of the reactants, having the formula

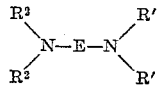

that may be employed include N,N'-tetramethylethylenediamine, N,-N'-tetraethylethylenediamine, N,N'-tetramethylpropylenediamine, N,N'-tetraethylisopropylenediamine, N,N' - tetramethylbutylenediamine, N,N - dimethylamino-ethylenemorpholine, N,N-diethylaminoisobutylenepyrrolidine, N,N-diethyl-N',N'-dimethylethylenediamine, N,N-dimethylaminoethylenepiperidine, 1,4 - bis(dimethylamino)-2-butyne, 1,4-bis(diethylamino)-2-butene, 1,4-bis(dimethylamino)-1,3-butadiene, N,N'-tetramethyl-2-hydroxypropylenediamine, and N,N'-tetraethyl-2-hydroxypropylenediamine.

It is possible, and often preferable, in the preparation of some of the present compounds to first prepare the halide form, such as chloride, and then prepare any other desired form, within the present definition, by metathesis or ion exchange methods. For instance, any of the present compounds in halide form, may be converted to the hydroxide form through the use of silver oxide or the like and then converted to any desired form by acidifying with an acid of choice such as sulfuric, phosphoric, acetic, and others within the range and spirit of this invention. In similar manner, an anion-exchange resin may be employed. Any of the present compounds in halide or hydroxide form may be converted to any desired anion form through the use of an anion-exchange resin in the desired anion form. For instance, there may be employed an insoluble, crosslinked, styrene-divinylbenzene copolymeric quaternary ammonium salt in its sulfate, phosphate, or like form to convert a present compound in halide or hydroxide form to a desired form such as phosphate, sulfate, and the like.

The compounds of this invention are valuable fungicides, for example, against *Stemphylium sarcinaeforme* and *Monilinia fructicola*. They are, also, active and useful bactericides, for example, against *Salmonella typhosa* and *Micrococcus pyogenes* var. *aureus*. The outstanding usefulness of the instant compounds is as antistatic agents, of the non-durable type, for hydrophobic fibers such as nylon, Dacron, Orlon. The present compounds exhibit useful wetting, detergent, and dispersant properties. These compounds, also, have physiological significance in that they effect increased hypotensive activity not necessarily associated with strong ganglionic blocking properties.

The compounds of this invention are valuable as detergent-sanitizers and may be employed in meat plants to sanitize cutting tables, grinders, and the like, in fruit processing operations, for instance, to wash and sanitize lemons, oranges, and grapefruit, and in dairy farms to sanitize dairy equipment and utensils.

A suitable detergent-santizer for use in meat plants includes, by weight, 5% of a compound of this invention, 2.5 to 5.0% of octylphenoxypolyethoxyethanol, 20 to 40% soda ash, 20 to 40% sodium metasilicate, and the remainder sodium tripolyphosphate. One ounce of this formulation is used per gallon of water. For santizing citrus fruit there is preferably used one part of a present compound in 5000 parts of water. For use in dairy farms, there may be used 10% of a quaternary ammonium compound of this invention, 10% of octylphenoxypolyethoxyethanol, 7% of trisodium phosphate, and 73% of water. One ounce of this solution is used per four gallons of water. The instant compounds in aqueous solution, in amounts of about 0.5 to one ounce to one hundred pounds of dry fabric, are excellent as a final diaper rinse to prevent diaper rash. These compounds are, also excellent premise sanitizers where they may be employed in concentrations of about 0.1 to 2.0% in aqueous cleaning solutions.

The unsymmetrical diquaternary ammonium compounds of this invention and their method of preparation may be more clearly understood from the following examples, which are offered by way of illustration and not by way of limitation. Parts by weight are used throughout.

*Example 1*

There are added to a flask equipped with a thermometer and a stirrer 116 parts of N,N'-tetramethylethylenediamine, 53 parts of methyl chloride, and 1500 parts of benzene. The mixture is allowed to stand overnight to permit reaction and subsequent formation of crystals. The crystals are filtered from the mixture washed quickly with benzene, and dried by evaporating the solvent under vacuum. The crystals contain 21.8% chlorine (21.3% theoretical) and 16.4% nitrogen (16.9% theoretical), melt at 138° to 140° C. and represent the first step quaternization compound which corresponds to 2-dimethylaminoethyltrimethylammonium chloride. There are added to a reaction flask 21.3 parts of 2-dimethylaminoethyltrimethylammonium chloride, 75 parts of isopropanol, 30 parts of dodecenyl chloride, and 0.5 part of sodium iodide. The mixture is heated at reflux for 16 hours. The mixture is filtered while hot and then is subjected to reduced pressure until its volume is decreased about one half. The resultant solution is chilled and the crystals that form are filtered, washed twice with hot acetone and then dried in a vacuum desiccator. The crystalline product contained 8.3% nitrogen (7.6% theoretical) and 21.1% chlorine (19.2% theoretical). The product corresponds to N-methyl-N'-dodecenyl-N,N' - ethylenebis(dimethylammonium chloride) and may be represented by the formula

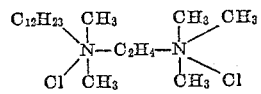

In like manner, there is made N-methyl-N'-octadecyl-N,N'-ethylenebis(dimethylammonium chloride) from octadecyl chloride, methyl chloride, and N,N'-tetramethylethylenediamine.

In a similar way, from N,N'-tetramethylbutenylenediamine, butenyl chloride, and hexoxyhexyl chloride there is prepared the unsymmetrical diquaternary ammonium compound corresponding to the formula

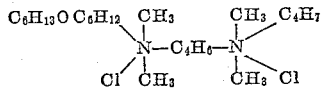

and from N-(dimethylaminoethyl)piperidine, propoxymethyl iodide, and eicosyl chloride there is made the compound corresponding to the formula

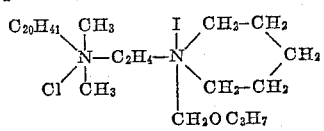

*Example 2*

There are added to a reaction flask 35 parts of 2-dimethylaminoethyltrimethylammonium chloride (made as in Example 1), 59.5 parts of dodecenyl chloride, 0.5 part of sodium iodide, 25 parts of methanol, and 75 parts of water. The mixture is agitated and maintained at reflux for 16 hours. The mixture is cooled and allowed to separate into layers. The water layer is separated and extracted twice with octane to remove any excess dodecenyl chloride. The aqueous layer is subjected to evaporation until all of the methanol is gone. The remaining liquid corresponds to an aqueous solution of the product which contains 8.1% nitrogen (7.6% theoretical) and may be named N-methyl-N'-dodecenyl-N,N'-ethylenebis(dimethylammonium chloride). To 48 parts of the above aqueous solution of product there are added 440 parts of water and 0.375 equivalent of a commercial insoluble cross-linked styrene-divinylbenzene copolymeric quaternary ammonium salt in its dihydrogen phosphate form. The resulting suspension is stirred at room temperature for 16 hours. The suspension is filtered to remove the insoluble copolymeric resin. The filtrate is concentrated by evaporation. The filtrate contains 2.0% phosphorus, 0.88% nitrogen, and 0.60% chlorine which indicates that about 70% of the original chloride ions has been replaced by dihydrogen phosphate ions.

*Example 3*

A mixture of 30 parts of 2-dimethylaminoethyltrimethylammonium chloride (made as in Example 1), 35.2 parts of 3,4-dichlorobenzyl chloride, 0.2 part of potassium iodide, and 325 parts of isopropanol is refluxed for ten hours and then filtered while hot. The filtrate is cooled to 2° C. and allowed to stand overnight. Crystals are formed and are removed by filtration. The crystals are washed twice with cold isopropanol and dried under vacuum over calcium chloride. The crystalline product melts at 195° to 197° C. and contains 18.6% ionizable chlorine (19.7% theoretical) and 7.4% nitrogen (7.7% theoretical). The product corresponds to N-methyl-N'-3,4 - dichlorobenzyl-N,N'-ethylenebis(dimethylammonium chloride).

In a similar way, from N,N-diethyl-N',N'-dimethylethylenediamine, ethyl chloroacetate, and eicosenyl bromide there is made the compound of this invention corresponding to the formula

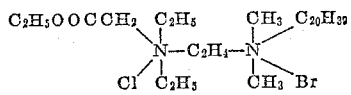

and from 1-(dimethylaminoethyl)morpholine, ethyl bromide, and phenylpentenyl bromide there is obtained the compound having the formula

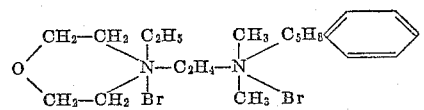

*Example 4*

There are introduced into a reaction vessel 15 parts of 2 - dimethylaminoethyltrimethylammonium chloride (made as in Example 1), 27.3 parts of dodecylmethylbenzyl chloride, 0.2 part of sodium iodide, and 150 parts of dry acetone. The reaction mixture is refluxed for 18 hours and then allowed to cool. Crystals form which are separated by filtration, washed with hot acetone, and dried under vacuum. The crystalline product corresponds to N-methyl-N'-dodecylmethylbenzyl - N,N' - ethylenebis-(dimethylammonium chloride).

In an analogous manner there is prepared, from 1,4-bis-(dimethylamino)-1,3-butadiene, allyl chloride, and methyl chlorononadecanoate, the unsymmetrical diquaternary ammonium compound corresponding to the formula

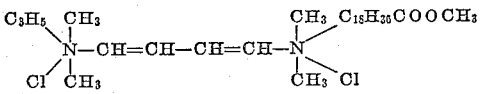

and from 1,4-bis(diethylamino)-2-butene, butyl iodide, and octaphenoxyethoxyethyl bromide there is produced the quaternary ammonium compound of this invention corresponding to the formula

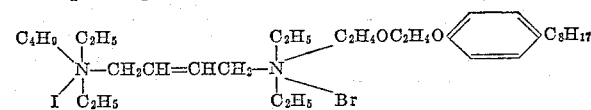

*Example 5*

To a solution of 42.6 parts of N,N'-tetramethylethylenediamine and 150 parts of dry benzene there is added dropwise at room temperature a solution of 31.6 parts of dimethyl sulfate and 25 parts of acetone. The resultant mixture is maintained at room temperature overnight. Crystals are formed, filtered off, washed with benzene, and dried in vacuum. The crystals correspond to 2-dimethylaminoethyltrimethylammonium methylsulfate and melt at 64° to 68° C. A mixture of 24.2 parts of the above crystals, 18.1 parts of 2-hydroxyoctyl chloride, 0.2 part of sodium iodide, 10 parts of isopropanol, and 200 parts of dry acetone is refluxed for 13 hours and then the resultant solution is concentrated to one third of its volume by evaporation. The solution is allowed to stand at 2° C. for seven days during which time crystals form. The crystals are hygroscopic and are isolated by rapid filtration. The crystals are washed with acetone and dried. The crystalline product contained 9.61% sulfur and 4.24% chlorine. The product is identified as N - methyl-N'-2-hydroxyoctyl-N,N'-ethylenebis(dimethylammonium)chloride methylsulfate.

In like manner there is prepared from N-(diethylaminoisobutyl)pyrrolidine, bromoacetamide, and decyl chloride the product having the formula

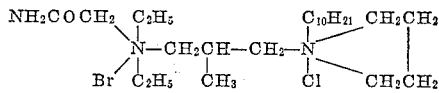

and from N,N'-tetramethylethylenediamine, propyl chloride, and chloroundecanamide there is made the compound having the formula

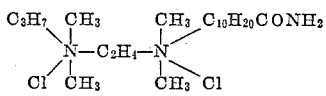

*Example 6*

There are added to a reaction flask 33.6 parts of N,N'-tetramethylethylenediamine, 33.2 parts of N-methoxymethylchloroacetamide, and 200 parts of acetonitrile. The resultant solution is heated at reflux, which is about 81° C., for 16 hours. The solution is allowed to cool and separate into layers. The lower layer is separated and subjected to an acetone-Dry Ice bath which causes solids to form. The solids are washed twice with acetone and dried under reduced pressure. The solid material contained 13.3% chlorine (14.0% theoretical) and 15.6% nitrogen (16.6% theoretical) and corresponded to 2-dimethylaminoethyl(N - methoxymethylcarbamoylmethyl) dimethylammonium chloride. A mixture of 17 parts of the above monoquaternary ammonium compound, 15.9 parts of dodecenyl chloride, 0.2 part of sodium iodide, 60 parts of water, and 30 parts of methanol is heated at reflux for 20 hours and then steam distilled to remove the methanol. The solution is washed three times with benzene and then evaporated to an aqueous syrupy residue which contains 14.1% chlorine and 8.3% nitrogen. The product is identified as N'-(N-methoxymethylcarbamoylmethyl) - N'' - dodecenyl-N',N''-ethylenebis(dimethylammonium chloride).

There are also prepared, from N,N'-tetramethylethylenediamine, methyl chloride, and pentyl chlorododecanoate, the compound having the formula

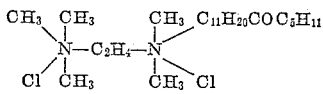

and, from N,N'-tetraethylpropylenediamine, ethyl chloride, and hydroxyoctadecyl chloride, the diquaternary ammonium compound having the formula

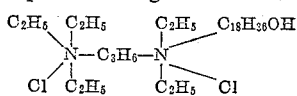

*Example 7*

A solution of 65 parts of N,N'-tetramethyltrimethylenediamine, 28 parts of methyl chloride, and 750 parts of anhydrous benzene is allowed to stand at 38° C. for six hours. Crystals are formed and are separated by filtration, washed once rapidly with dry benzene, and dried under vacuum. The crystals are identified as primarily the monoquaternary ammonium compound 3-dimethylaminopropyltrimethylammonium chloride. A solution of 20 parts of the above monoquaternary ammonium compound, 26.1 parts of dodecenyl chloride, 20 parts of isopropanol, and 40 parts of acetone is refluxed for 16 hours, cooled, and filtered. The crystalline solid product, isolated by filtration, is washed and dried. The product contains 7.6% nitrogen (7.31% theoretical) and 19.9% chlorine (18.5% theoretical) and corresponds to N - methyl-N'-dodecenyl-N,N'-trimethylenebis(dimethylammonium chloride).

In like manner there are made, from N,N'-tetramethylethylenediamine, ethyl chloride, and methoxycarbonylbenzyl chloride, the compound having the formula

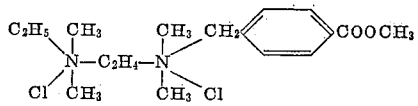

and, from N,N'-tetramethylethylenediamine, methyl bromide, and heptenyl chloride, the compound having the formula

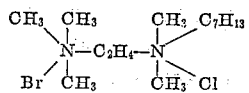

There is made in a similar way, from N,N'-tetramethyl-2-hydroxypropylenediamine, methyl chloride, and dodecenyl chloride, the compound having the formula

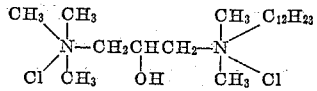

*Example 8*

There are added to a reaction flask 68 parts of 1,4-bis-(dimethylamino)-2-butyne, 12.3 parts of methyl chloride, and 325 parts of dry benzene. The mixture is allowed to stand at 50° C. for two hours. As the system cools crystals are formed, separated by filtration, and washed rapidly with benzene. The crystals are dried under vacuum and identified as 4-dimethylamino-2-butynyltrimethylammonium chloride. These crystals contain 18.8% chlorine (18.6% theoretical) and 14.4% nitrogen (14.69% theoretical) and melt at 183° to 185° C. A mixture of 15 parts of the above crystals, 17.8 parts of dodecenyl chloride, and 50 parts of dry acetone is refluxed for 16 hours, cooled, and filtered. The solid product is washed rapidly with dry acetone and dried under reduced pressure. (The product contains 11.4% nitrogen (7.13% theoretical) indicating that a substantial portion of the monoquaternary ammonium compound is not converted to the diquaternary ammonium compound in the reaction time that is used.

A mixture of 15.7 parts of the mixed quaternary product above, 9.7 parts of dodecenyl chloride, 75 parts of dry acetone, one part of isopropanol, and 0.1 part of sodium iodide is refluxed for 16 hours and then is isolated as above. The product contains 18.5% chlorine (18.0% theoretical) and 8.1% nitrogen (7.13% theoretical) indicating a high degree of conversion to the diquaternary ammonium compound N-methyl - N' - dodecenyl-N,N'-2-butynylenebis(dimethylammonium chloride). In a similar way, there is prepared N-methyl-N'-octadecyl-N,N'-2-butynylenebis(dimethylammonium chloride) from octadecyl chloride, methyl chloride, and 1,4-bis(dimethylamino)-2-butyne.

*Example 9*

A solution of 30 parts of N,N'-tetraethylethylenediamine, 23.9 parts of butyl bromide, and 150 parts of dry benzene is heated at reflux for 16 hours and then allowed to cool and separate into layers. The lower layer is separated, washed, and dried. To 5.8 parts of the dried lower layer there are added 3.4 parts of cyclohexylchloromethyl ether, 0.05 part of sodium iodide, and 100 parts of dry acetone. The resultant solution is heated at reflux for 20 hours and then allowed to cool and separate into layers. The oily layer is separated, rinsed with petroleum ether, and dried in vacuo. The product is a heavy, tan, hygroscopic semi-solid containing 8.7% chlorine, 21.8% bromine, and 6.97% nitrogen. The product corresponds to N-butyl - N' - cyclohexoxymethyl - N,N' - ethylenebis(diethylammonium)bromide chloride.

There are also prepared in a manner similar to that employed above the diquaternary ammonium compounds having the formulas

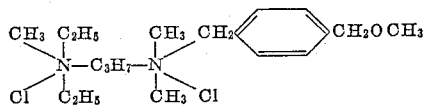

and

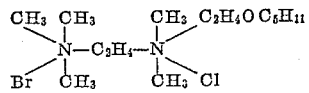

from N,N-dimethyl-N',N'-diethylpropylenediamine, methyl chloride, and methoxymethylbenzyl chloride, and N,N'-tetramethylethylenediamine, methyl bromide, and pentoxyethyl chloride, respectively.

*Example 10*

A mixture of 84.3 parts of aqueous 69% N,N'-tetramethylethylenediamine, 57.6 parts of aqueous 85% phosphoric acid, 24.2 parts of ethylene oxide, and 168 parts of water is heated at 60° C. in an autoclave for six hours. There is obtained an aqueous solution of 2-dimethylaminoethyl-2-hydroxyethyldimethylammonium dihydrogenphosphate. There are then added to 167 parts the above aqueous monoquaternization compound 71 parts of dodecenyl chloride, 0.5 part of sodium iodide and 30 parts of methanol. The resultant mixture is heated at reflux for 16 hours and then steam distilled for two and one half hours leaving an aqueous solution of N-2-hydroxyethyl - N' - dodecenyl-N,N'-ethylenebis(dimethylammonium)chloride dihydrogenphosphate. The product contained 8.3% chlorine, 5.2% nitrogen, and 6.2% phosphorus.

In the examples set forth above, sodium or potassium iodide is employed in most instances. The results in all of these examples are satisfactory in the absence of sodium or potassium iodide, although somewhat longer reaction times are generally needed to produce comparable yields. The use of the stated iodide is a preferred but not absolutely necessary condition.

I claim:

1. As a composition of matter, the compound having the formula

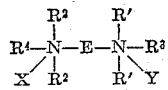

in which R' and R² are alkyl groups of no more than two carbon atoms, R³ is an alkyl group of one to four carbon atoms, R⁴ is an alkenyl group of seven to twenty carbon atoms, E is an alkenylene group of two to four carbon atoms, and X and Y are halogen atoms having an atomic weight of about 35.5 to 127.

2. As a composition of matter, the compound having the formula

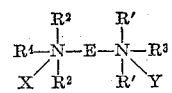

in which R' and R² are alkyl groups of no more than two carbon atoms, R³ is an alkyl group of one to four carbon atoms, R⁴ is an alkenyl group of seven to twenty carbon atoms, E is an alkynylene group of two to four carbon atoms, and X and Y are halogen atoms having an atomic weight of about 35.5 to 127.

3. As a composition of matter, the compound having the formula

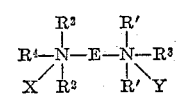

in which R' and R² are alkyl groups of no more than two carbon atoms, R³ is an alkyl group of one to four carbon atoms, R⁴ is an alkenyl group of seven to twenty carbon atoms, E is the 2-hydroxypropylene group, and X and Y are halogen atoms having an atomic weight of about 35.5 to 127.

4. As a composition of matter, the compound having the formula

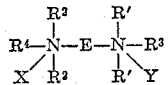

in which R' and R² are alkyl groups of no more than two carbon atoms, R³ is an alkyl group of one to four carbon atoms, R⁴ is an aralkyl group of seven to twenty carbon atoms, E is an alkylene group of two to four carbon atoms, and X and Y are halogen atoms having an atomic weight of about 35.5 to 127.

5. As a composition of matter, the compound having the formula

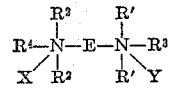

in which R' and R² are alkyl groups of no more than two carbon atoms, R³ is an alkyl group of one to four carbon atoms, R⁴ is a halobenzyl group, E is an alkylene group of two to four carbon atoms, and X and Y are halogen atoms having an atomic weight of about 35.5 to 127.

6. The compound of the formula

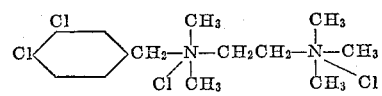

7. As a composition of matter, N-methyl-N'-dodecylmethylbenzyl-N,N'-ethylenebis(dimethylammonium chloride).

8. As a composition of matter, N-methyl-N'-dodecyl-N,N'-2-butynylenebis(dimethylammonium chloride).

9. As a composition of matter, N-methyl-N'-octadecyl-N,N'-2-butynylenebis(dimethylammonium chloride).

10. As a composition of matter, N-2-hydroxyethyl-N'-dodecenyl - N,N' - ethylenebis(dimethylammonium)chloride dihydrogenphosphate.

References Cited in the file of this patent

UNITED STATES PATENTS

| | | |
|---|---|---|
| 2,267,205 | Kyrides | Dec. 23, 1941 |
| 2,375,853 | Kirby et al. | May 15, 1945 |
| 2,525,777 | De Benneville | Oct. 17, 1950 |
| 2,525,778 | De Benneville et al. | Oct. 17, 1950 |
| 2,525,779 | De Benneville et al. | Oct. 17, 1950 |
| 2,627,491 | Szabo et al. | Feb. 3, 1953 |
| 2,716,134 | Reynolds et al. | Aug. 23, 1955 |
| 2,748,139 | Scudi et al. | May 29, 1956 |
| 2,813,904 | Lott et al. | Nov. 19, 1957 |

FOREIGN PATENTS

| | | |
|---|---|---|
| 547,987 | Germany | Apr. 1, 1932 |
| 85,873 | Sweden | Apr. 24, 1936 |
| 56,442 | Norway | Apr. 20, 1936 |
| 806,662 | France | Sept. 28, 1936 |

OTHER REFERENCES

Chem. Abst. 47:10755c (Elliker); 47 12673 ad (Spur and Minor); 46:684hi, 685ab (Resuggan, Ali, and Mueller et al.); 46:5659i, 5660a (Chaplin).

Stewart: "Soap and Sanitary Chemicals," April 1950, pp. 124–127.

Duca et al.: "Proc. Soc. Expt'l Biol. Med.," vol. 78, pp. 99–100 (1951).

Reinhard et al.: "J. Pharm. Expt'l Therap.," vol. 103, No. 1, pp. 288–92 (1951).